Nov. 5, 1935.　　　　R. B. CALCUTT　　　　2,020,103
WEATHER STRIP
Original Filed Sept. 1, 1934　　2 Sheets-Sheet 1
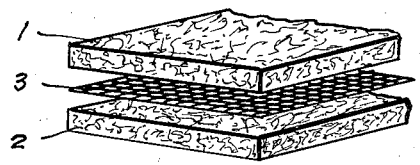
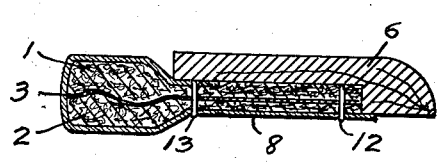
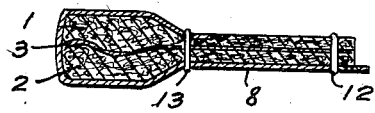
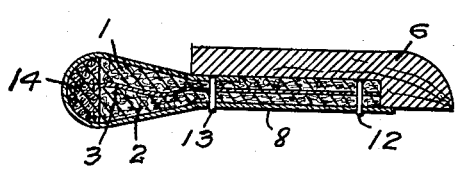
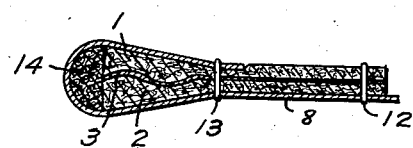
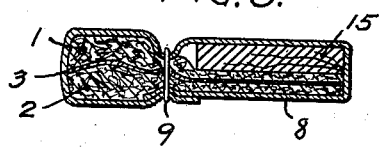
Inventor:
REGINALD B. CALCUTT.
ATTY Nov. 5, 1935.   R. B. CALCUTT   2,020,103
WEATHER STRIP
Original Filed Sept. 1, 1934   2 Sheets-Sheet 2

Inventor:
REGINALD B. CALCUTT
ATTY

Patented Nov. 5, 1935

2,020,103

UNITED STATES PATENT OFFICE 2,020,103

WEATHER STRIP

Reginald B. Calcutt, Chicago, Ill.

Substitution of application Serial No. 742,488, September 1, 1934. This application August 9, 1935, Serial No. 35,550

19 Claims. (Cl. 20—69)

This application is a substitute for my prior application for the same subject-matter which was filed by me September 1, 1934, Serial Number 742,488.

My present invention relates to a weather-strip or gasket such as used to seal the joint between doors or windows and the frames or supporting structures on which the doors or windows are mounted. Other uses, of course, will be obvious to persons skilled in the art.

I have devised an article of the type herein described that is capable of being produced in divers lengths for convenient storage and handling. The weather-strip which I have produced is provided with a projecting portion to be engaged with the window or door so that said portion will readily cushion or flex to take care of any unevenness in the surface it may contact, thus accommodating itself and conforming to faulty window or door construction as well as distortion due to atmospheric changes.

The article contemplated herein preferably comprises a felt or fibrous strip that may be single or multiple-ply and may be enveloped partly or entirely in a protective covering and a molding piece may, if desired, be utilized for mounting the weather-strip. When the multiple-ply fibrous piece is used the superposed layers are preferably united by a thin ribbon of suitable material to which the respective layers are adhered. The covering is such that it protects the portions of the weather-strip that are exposed when in use.

One of the objects of my invention is to provide a weather-strip that comprises a plurality of parts that preferably may be assembled by a single operation which thereby materially reduces the cost of manufacture. Other objects reside in providing a weather-strip that is effective in performing its functions, that is novel in construction, that is easy to attach, and which may be economically manufactured so that it may be retailed at a reasonable price to the consumer. Other objects will be apparent to persons skilled in the art, after my invention is understood from the accompanying description and drawings.

I prefer to accomplish the numerous objects of my invention and to practice the same in substantially the manner described herein and as particularly pointed out in the claims. Reference will now be made to the accompanying drawings forming a part of this specification.

In the drawings:—

Fig. 1 is a fragmentary perspective showing an end of a filler that is employed in most of the forms of my invention, the parts being separated in superposed relation prior to assembly.

Fig. 2 is a transverse section of a form of my weather-strip using multiple ply cushioning material and mounted on a piece of molding; and, Fig. 3 shows the molding omitted.

Fig. 4 is a transverse section of a modified form of weather-strip utilizing the multiple ply cushion with wicking at its working edge, the parts being mounted upon a molding strip; and, Fig. 5 shows the molding omitted.

Fig. 6 is a transverse section of a modified form of my weather-strip utilizing multiple ply cushioning material and a longitudinal stiffener in face contact with the cushion material to compress it.

Figs. 7 and 8 show in section, two forms of modified cushion of the multiple ply type.

The drawings are to be understood as being more or less schematic for the purpose of illustrating typical or preferred forms in which my invention may be made and in these drawings like reference characters designate like parts wherever they appear in the different views.

Figure 9:
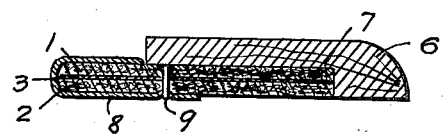
Figs. 9 and 10 are transverse sections showing modified forms with a covering surrounding portions of the cushion.

I have ascertained that a desirable cushioning material for weather-stripping is a ribbon of fibrous material that is flexible and pliable and has the inherent quality of being readily cushioned when engaged with the opposing window or door. Such material is a relatively inexpensive grade of felt, and in this connection I use the felt either as a single ply, or a double or multiple ply as desired or required. The felt is preferably cut in relatively long narrow ribbons and one or more of these ribbons may be utilized in the manner hereinafter described.

In Fig. 1, I show cushioning material of the multiple-ply type consisting of superposed layers or plies 1 and 2, and an intermediate or interposed layer or ply 3 of fabric. The intermediate fabric ply may be burlap, cheese-cloth or other similar woven fabric and the superposed layers or plies 1 and 2 are pressed against the intermediate fabric ply 3 after the latter has been treated with a suitable adhesive so as to join the three plies into one integral piece. The interposed fabric may be, and preferably is, treated with "sizing" so as to give it a relative stiffness as compared to the felt ribbons and this stiffness tends to retain the weather-strip in normal shape when in use so as to urge the working edge of the weather-strip towards the movable element of the door or window structure.

It is sometimes found desirable to protect the cushion and to do this I provide it with a suitable cover 8 such as shown in the different views. The cover 8, which I prefer to employ, is a closely woven fabric and is coated upon one surface, preferably the outside surface, with water-proofing material such as rubber or other weather-proof composition.

Rubberized or weather-proofed cloth is, of course, readily available upon the market and it is well adapted for the purpose. A length of this cloth is folded or wrapped around the multiple-ply cushion and the longitudinal edges of the cloth are secured in place by means of stitches 9 that extend longitudinally of the strip preferably about midway its edges. This type of weather-strip does not necessarily require a molding or the like and consequently it may be made in lengths of say one hundred (100) or more feet and wound upon a spool or reel for ready storage and handling. This weather-strip is attached to the window-frame or door-frame by driving tacks directly through the parts. The slightly stiffened fabric insert 3 will assist in retaining the weather-strip in normal operative position and urge the working edge towards the movable member of the structure.

Figs. 2 and 3 show the use of the multiple-ply cushion in which the covering fabric 8 does not extend entirely around the same, but is omitted on a portion of the surface next the molding and at the right-hand edge. The right-hand portion of the cushion is joined to the cover by a row of stitches 12 that tend to compress the plies of the felt and there is a second row of stitches 13 at one side of the longitudinal center of the cushion.

When the stitches 13 are being made it is preferred to draw the adjacent edge of the covering material tightly towards the opposite edge so as to cause the felt to bulge as shown at the left in Figs. 2 and 3. As shown in Fig. 2, the structure just described, the uncovered portion of the cushion may be cemented to a molding piece 6, or the molding may be omitted as shown in Fig. 3.

It is sometimes desirable to have a working edge that is softer than the working edge that is shown in Figs. 2 and 3. This may be readily accomplished by inserting lengths of roving or wicking 14 in the outer edge of the weather-strip within the cover 8 as illustrated in Figs. 4 and 5. These two figures show the structures similar to those in Figs. 2 and 3 with the multiple ply cushion having the covering 8 stitched in two locations and assembled either with or without the molding 6. The roving or wicking 14 will be slightly compressed when the parts are being assembled and it will provide a rounded edge having a snugger contact with the window or door than the structures shown in Figs. 2 and 3.

A thin wood piece 15 may be compressed against the cushion when the parts are being assembled and thus slightly compacts the plies of felt between it and the cover 8 as shown in Fig. 6. This compression takes place at the time the stitches 9 are sewn through the fabric cover. The cushion and the stitches are beyond the edge of the wood strip 15 so that the intermediate fabric ply 3 and the plies of felt 1 and 2 become slightly distorted.

Single-ply felt or similar ribbon may be used in place of the multiple-ply ribbon, and the same may be pressed against a portion of its width by means of the wood piece 15 in the same manner as the multiple-ply cushion is pressed in position in Fig. 6.

In Fig. 9 a molding and a cushion are shown and the exposed portion of the multiple-ply cushion is covered with the fabric 8 that extends over the outer or projecting portion of the cushion beyond the molding and its edges are secured together by stitches 9 that are disposed back of the edge of the molding 6. When this article is mounted upon the window or door frame the portion forming the lower surface in Fig. 9 fits against the frame and is not exposed. The uncovered portion of the cushion is anchored in place in the molding by cementing or the like.

Figure 10:
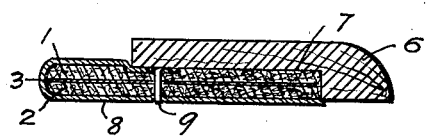
Figure 11:
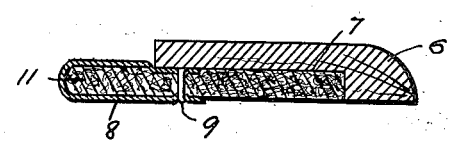
Figs. 11 and 12 are transverse sections of modified forms of my weather-strip utilizing a single ply cushion with a protective covering arranged similar to Figs. 9 and 10.
Figure 12:
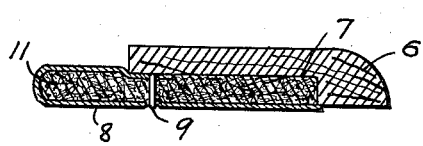

The cover 8 may, if desired, be extended over the entire outer or lower surface of the cushion as detailed in Fig. 10. A single-ply cushion of felt may be provided with the cover 8, either terminated near the stitching 9 as shown in Fig. 11 or extended over the entire outer or lower surface of the cushioning material as shown in Fig. 12. In both instances the stitches 9 are hidden from view back of the edge of the molding and the cushion is anchored to the molding by cement or otherwise.

Figure 13:
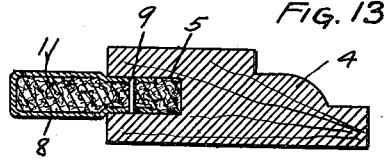
Figs. 13 and 14 show two views in cross-section of modified forms utilizing single ply cushions with a cover thereon and inserted in a channel in an edge of a molding and with the stitches respectively inside and outside the channel.
Figure 14:
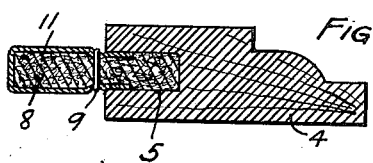

The single-ply cushion 11 may be inserted into a rectangular edge channel 5 of a molding 4, and the protruding portion of the cushion may be protected by the cover 8 as shown in Figs. 13 and 14. In Fig. 13, the fabric cover is united to the single-ply cushion by stitches 9 that may be disposed inside the channel 5 of the molding and in Fig. 14 the stitches are outside the channel.

Figure 15:
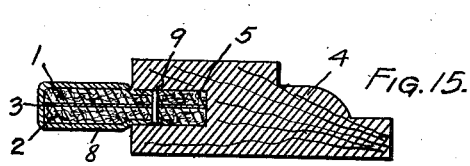
Figs. 15 and 16 show two views in cross-section of modified forms utilizing multiple ply cushions with a cover and stitches disposed as in the forms shown in Figs. 13 and 14.
Figure 16:
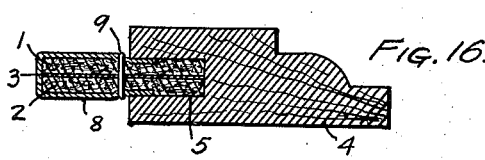

The multiple-ply cushion may be protected by the fabric cover when inserted in the edge channel 5 of the molding strip 4. This is shown in Figs. 15 and 16, wherein the stitches for uniting the cover to the cushion are shown respectively within or outside the channel, in the same manner as disclosed in Figs. 13 and 14.

The multiple-ply cushion may be in the form hereinbefore shown and described and preferably consists of the superposed felt or fibrous plies 1 and 2 with the intermediate cloth ply 3 united thereto. Of course, it is possible to modify this and I have shown in Figs. 7 and 8 the intermediate ply as being either a thin sheet of plain rubber or a sheet of rubberized cloth. In both instances the rubber or the rubberized cloth is preferably vulcanized to the upper and lower plies of cushioning material.

What I claim is:—

1. A weather-strip comprising a flat strip of soft pliable material compressed transversely to the desired shape, a fabric cover enveloping one edge and portions of the two faces of the strip, means securing the fabric cover in place to maintain said strip in the desired shape, and mesh fabric adhered to said strip to reinforce the latter.

2. A weather-strip comprising superposed flat strips of soft pliable material compressed transversely to the desired shape, a fabric cover enveloping the working edge and portions of the outer faces of said strips, means securing the fabric cover in place to maintain said strips in the desired shape and mesh fabric interposed between said strips to reinforce the latter.

3. A weather-strip comprising superposed flat strips of soft pliable material compressed transversely to the desired shape, a fabric cover enveloping the working edge and portions of the outer faces of said strips, means securing the fabric cover in place to maintain said strips in the desired shape, and mesh fabric adhered to the inner faces of said strips to reinforce the latter.

4. A weather-strip comprising superposed flat strips of soft fibrous material compressed transversely to the desired shape, a fabric cover enveloping the working edge and portions of the outer faces of said strips, means securing the fabric cover in place to maintain said strips in the desired shape, and mesh fabric interposed between said strips and adhered to adjacent faces thereof to reinforce the latter whereby fibers of said strips are adhered to each other through the interstices of said mesh fabric.

5. A weather-strip comprising a flat strip of soft pliable material, a fabric cover enveloping one edge and one face and a portion of the other face of said strip, means securing the fabric cover in place to maintain the strip in shape, and mesh fabric adhered to said strip to reinforce the latter.

6. A weather-strip comprising a flat strip of soft pliable material, formed of two superimposed plies, a fabric cover enveloping one edge and one face and a portion of the other face of said strip, means securing the fabric cover in place to maintain the strip in shape, and a ply of mesh fabric interposed between the plies of said flat strip to reinforce the latter.

7. A weather-strip comprising a flat strip of soft pliable material compressed transversely to the desired shape, a fabric cover enveloping the outer working edge and portions of the two faces of the strip, and means securing the fabric cover in place to maintain strip in the desired shape.

8. A weather-strip comprising a flat strip of soft pliable material, a fabric cover enveloping the outer working edge and one face and a portion of the other face of said strip, and means securing the fabric cover in place to maintain the strip in shape.

9. A weather-strip comprising a flat strip of soft pliable material compressed transversely to the desired shape, a fabric cover enveloping one edge and portions of the two faces of the strip, means securing the fabric cover in place to maintain said strip in the desired shape, and a ply of yieldable material adhered to said strip to reinforce the latter.

10. A weather-strip comprising superposed flat strips of soft pliable material compressed transversely to the desired shape, a fabric cover enveloping the working edge and portions of the outer faces of said strips, means securing the fabric cover in place to maintain said strips in the desired shape and a ply of yieldable material interposed between said strips and adhered thereto to reinforce the latter.

11. A weather-strip comprising a flat strip of soft pliable material, a fabric cover enveloping one edge and one face and a portion of the other face of said strip, means securing the fabric cover in place to maintain the strip in shape, and a ply of yieldable material adhered to said strip to reinforce the latter.

12. A weather-strip comprising a flat strip of soft pliable material, formed of two superimposed plies, a fabric cover enveloping one edge and one face and a portion of the other face of said strip, means securing the fabric cover in place to maintain the strip in shape, and a ply of yieldable material interposed between the plies of said flat strip and adhered thereto to reinforce the latter.

13. A weather-strip comprising a flat strip of soft pliable material, a fabric cover enveloping the outer working edge and portions of the two faces of said strip, and means securing the fabric cover in place to maintain the strip in shape.

14. A weather-strip comprising superposed flat strips of soft pliable material, a fabric cover enveloping the outer working edge and portions of the faces of said strips, and means securing the fabric cover in place to maintain the strip in shape.

15. A weather-strip comprising a flat strip of soft pliable material, a fabric cover enveloping the outer working edge and portions of the two faces of said strip, means securing the fabric cover in place to maintain the strip in shape, and a ply of yieldable material coacting with the soft pliable material.

16. A weather-strip comprising superposed flat strips of soft pliable material, a fabric cover enveloping the outer working edge and portions of the faces of said strips, means securing the fabric cover in place to maintain the strip in shape, and a ply of yieldable material coacting with the soft pliable material.

17. A weather-strip comprising superposed plies of soft pliable material, a fabric cover enveloping the outer working edge and portions of the outer faces of said plies, and means securing the fabric cover in place to maintain said pliable material in shape.

18. A weather-strip comprising superposed plies of soft pliable material, a fabric cover enveloping the outer working edge and portions of the outer faces of said plies, means securing the fabric cover in place to maintain said pliable material in shape, and a ply of yieldable material coacting with the soft pliable material to reinforce the latter.

19. A weather-strip comprising superposed plies of soft pliable material, a fabric cover enveloping the outer working edge and portions of the outer faces of said plies, means securing the fabric cover in place to maintain said pliable material in shape, and a ply of yieldable material coacting with the soft pliable material and extending in general directions substantially parallel with said outer faces of the pliable material to reinforce the latter.

REGINALD B. CALCUTT.